Dec. 31, 1963 S. W. LIS ETAL 3,115,667
POULTRY FOOT CUTTER
Filed Aug. 5, 1960 2 Sheets-Sheet 1

STEPHEN W. LIS
DELOS B. VAN DOLAH
JOHN A. BRENDLE
INVENTORS.

BY R. A. Story

ATTORNEY

Dec. 31, 1963   S. W. LIS ETAL   3,115,667
POULTRY FOOT CUTTER
Filed Aug. 5, 1960   2 Sheets-Sheet 2
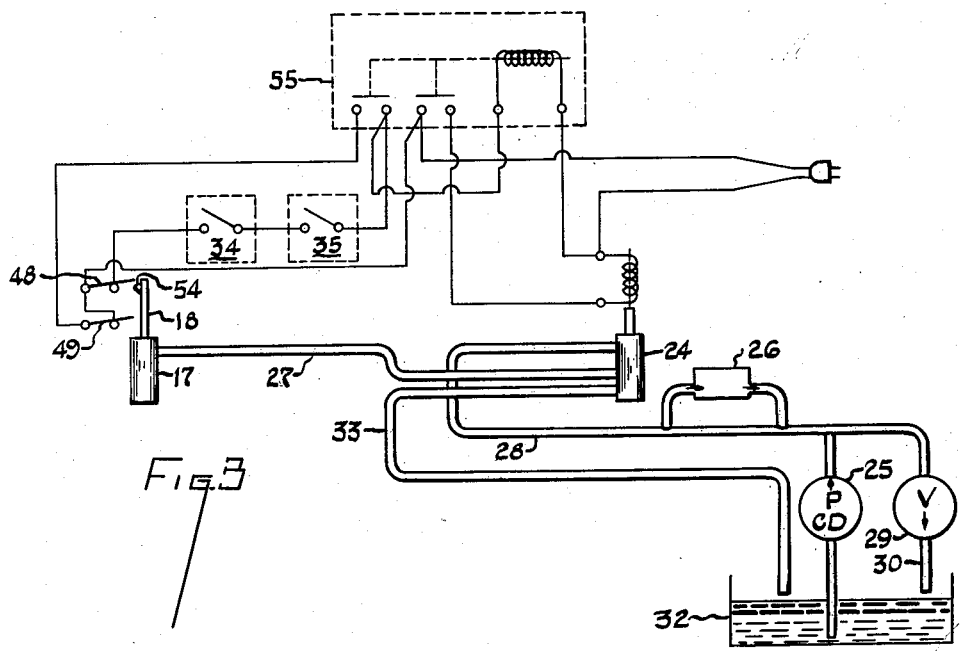
FIG.3
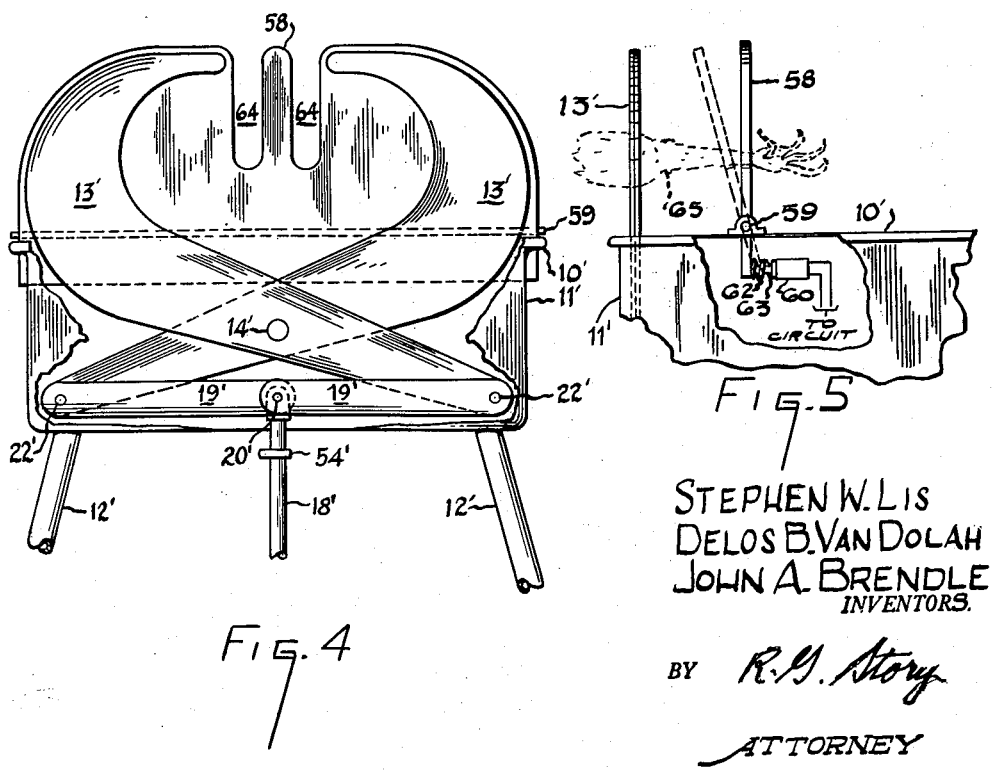
FIG.4
FIG.5
STEPHEN W. LIS
DELOS B. VAN DOLAH
JOHN A. BRENDLE
INVENTORS.
BY R.G. Story
ATTORNEY

United States Patent Office 3,115,667
Patented Dec. 31, 1963

3,115,667
POULTRY FOOT CUTTER
Stephen W. Lis and Delos B. Van Dolah, Chicago, and John A. Brendle, La Grange, Ill., assignors to Swift & Company, Chicago, Ill., a corporation of Illinois
Filed Aug. 5, 1960, Ser. No. 47,845
9 Claims. (Cl. 17—11)

The present invention relates to a poultry foot cutting apparatus, and more specifically to an improved power driven poultry foot cutter.

In recent years an increased consumer demand for dressed poultry has led to the development of an extensive and highly specialized poultry processing industry. Like most modern food processing industries, the poultry dressing industry is highly competitive, and consequently those engaged in large scale poultry dressing are constantly searching for means and methods to increase the efficiency of their operations in order to gain a competitive advantage over others in the industry. In light of today's high labor costs, and in view of the fact that most poultry dressing operations have been traditionally carried out by hand, most of the poultry processing industry's efforts toward increasing its overall processing efficiency have been directed toward the development of efficient, high speed machinery which is capable of performing those dressing tasks which have heretofore been carried out manually and are often inherently inefficient.

One poultry dressing operation which is frequently carried out by hand today, even in the largest of poultry processing plants, is the removal of the feet from the semi-processed fowl. Generally, in performing this operation, an operator grasps the slaughtered fowl by the upper portion of each leg, lays the lower leg portion including the foot over a chopping block, and severs the foot at the hock joint with a blow of a meat cleaver or other suitable heavy knife. Normally the above operation is repeated twice for each bird, that is, once for each foot.

It is obvious that the above described operation has many drawbacks in that (1) the accuracy with which the hock joint is severed is dependent upon the skill of the operator, (2) the operator's hand which holds the fowls is in constant danger of being cut, and (3) the operation is time consuming and quite expensive from the labor standpoint, particularly when large numbers of fowl are processed.

It is therefore an object of this invention to provide an automatic power driven device for severing the feet of poultry.

It is a further object of this invention to provide an automatic poultry foot cutter that accurately severs both feet from poultry at the hock joint in one operation.

It is still a further object of this invention to provide an apparatus for severing the feet from fowl that is efficient, simple, and safe in operation.

In general, the present invention contemplates a poultry foot cutter which comprises a power driven shear, i.e. a pair of cutter blades generally in shearing relationship, means to position the legs of a fowl in cutting relationship with respect to the shear, and means to activate the power driven shear when the fowl is in cutting position. The activation of the power driven shear is done via a controlling circuit which preferably includes a shear activating control that is operatively connected to a fowl responsive member in a manner that advantageously permits an operator to activate the shear by exerting a force on a fowl engaged on said responsive member, and thereby leaves the operator's hands free to position and handle the fowl.

Further objects and advantages will become readily apparent to one skilled in the art from the following description of the invention taken in conjunction with the drawings wherein:

FIGURE 3 is a schematic diagram of the electrical and hydraulic circuits used to activate the apparatus shown in FIGURES 1 and 2;

FIGURE 4 is a partial front elevation of a second embodiment of the present invention with parts broken away; and FIGURE 5 is a partial side elevation of the apparatus shown in FIGURE 4 with parts broken away.

Figure 1:
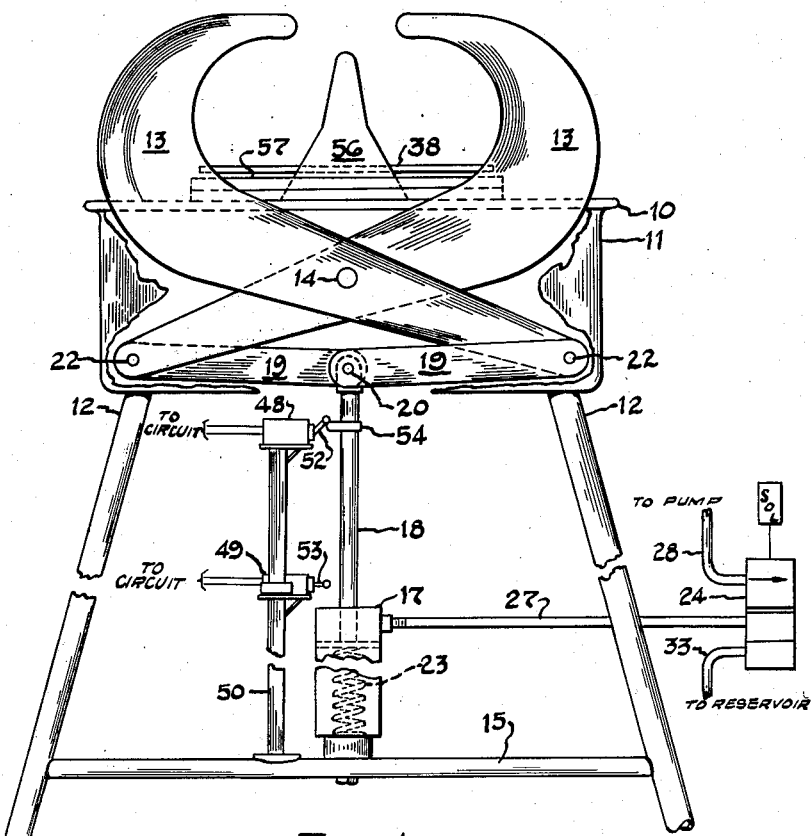
FIGURE 1 is a front elevation of the preferred embodiment of the invention with parts broken away.
Figure 2:
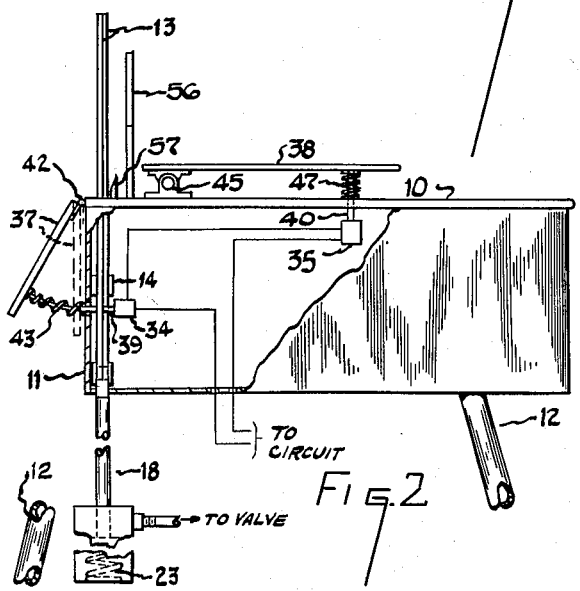
FIGURE 2 is a side elevation from the right side of the apparatus of FIGURE 1 with parts broken away.

Referring to FIGURES 1 and 2, there is illustrated a preferred device having a table top 10, generally reinforced and supported by a case 11 and four legs 12.

Towards the front of table top 10 pivotally mounted in a plane generally perpendicular to said table top, are shearing blades 13. A pivotal support 14, which supports both of blades 13 in scissor-like relation, is rigidly mounted to the front portion of case 11 as may be seen in FIGURE 2.

Below table top 10, with one end anchored to a leg cross support 15, is a spring loaded hydraulic cylinder 17. The movable piston of cylinder 17 is connected to each of shearing blades 13 through a piston rod 18 and a pair of intermediate links 19. Rod 18 is pivotally connected to one end of both of links 19 by a pin 20. The opposite end of links 19 are pivotally connected to each of blades 13 by pins 22. Located within cylinder 17 is an expandable spring 23 that normally maintains piston rod 18 in its uppermost position in the absence of applied fluid pressure.

Reference to FIGURE 1 and the schematic diagram shown in FIGURE 3, shows that the action of hydraulic cylinder 17 is regulated by a two way solenoid valve 24, and that fluid under pressure is generally supplied to cylinder 17 by a hydraulic pump 25 through a pressure accumulator 26 by way of a pair of conduits 27 and 28. Conduit 27 connects the center, i.e. common, port of valve 24 to cylinder 17, while conduit 28 connects the upper port of valve 24 to the pressure source. Excess fluid pressure produced by constant delivery pump 25 is released by a pressure by-pass valve 29 which diverts fluid through a conduit 30 into a reservoir 32. Cylinder 17 is emptied of hydraulic fluid by way of conduit 27 and the valve 24 which is connected to a return conduit 33 leading to reservoir 32.

Reference to FIGURE 2 shows that a pair of activating switches 34 and 35 are each in connective relationship with a depressable activating plate 37 and 38 by way of a connecting member 39 and 40 respectively. Activating plate 37 is pivotally mounted by means of a hinge 42 on the front edge of table top 10. A coil spring 43, slidably centered about link 39 and compressively mounted between the front of case 11 and the bottom of plate 37, maintains plate 37 resiliently extended from the front of case 11 and out of contact with the switch connecting member 39. Pressure exerted on plate 37 will cause it to swing toward case 11 thus permitting the bottom of plate 37 to make contact with the switch connecting member 39 which in turn closes the switch 34. Activating plate 38 is pivotally mounted on the top of table 10 by means of a hinge 45 in a generally horizontal position. A spring 47, which is slidably located about switch connecting member 40, maintains plate 38 resiliently positioned above and out of contact with the end of switch connecting member 40. Downward force applied to the top of plate 38 will cause the plate to swing down and close switch 35 by way of connecting member 40.

Referring again to FIGURE 1, it is seen that a pair of limit switches 48 and 49 are mounted on a vertical support 50 (FIGURE 1) with their respective spring loaded connecting members 52 and 53 just out of slidable contact with the piston rod 18 and a cam lug 54 mounted thereon.

Referring to FIGURES 1 and 3, it is seen that the two way solenoid valve 24 is biased to normally connect cylinder 17 with return conduit 33, and that the coil and armature of valve 24, when energized, cause the valve to connect cylinder 17 with the fluid pressure source through conduit 27. The activating switches 34 and 35 in conjunction with the limit switches 48 and 49, electrically control the valve 24. Limit switch 48 is spring biased in a normally open position, and switch 49 is similarly biased in a normally closed position. It is seen that the closing of series connected activating switches 34 and 35 completes the circuit to the coil of a normally open double pole relay 55 by way of limit switch 48 which at the beginning of the cycle is held in a closed position by the cam lug 54 mounted on the piston rod 18. The closing of relay 55 energizes the solenoid of valve 24 which causes the valve to change from its normal emptying position to its fluid delivery position. Electric current to the solenoid valve 24 is maintained until cylinder 17 reaches the bottom of its power stroke, at such time the cam lug 54 opens bottom limit switch 49 which in turn causes relay 55 to open whereupon the solenoid of valve 24 becomes de-energized. Solenoid valve 24 then changes to its emptying position thereby allowing cylinder 17 to empty by reason of the force exerted by compressed cylinder spring 23. The emptying of cylinder 17 causes the blades 13 to reassume their open position and simultaneously causes the limit switch 48 to close by action of upward moving cam lug 54. At the time the limit switch 48 is closed, switches 34 and 35 are reset and ready to be closed to initiate another cycle.

Extending perpendicularly from the surface of table top 10 as shown in FIGURES 1 and 2 are a fowl leg guide member 56 and a hock joint positioning knife 57. Leg guide member 56 is spaced from blades 13 between plate 38 and shearing blades 13 with its vertical center line substantially in line with the axis of the pivotal support 14 of the blades 13 and is substantially parallel to said blades. The positioning knife 57 is located between leg guide 56 and shearing blades 13 with its sharp edge substantially parallel to the surface of table top 10. The function of knife 57 and leg guide 56 is to provide an operator with a gauge by which he can position the fowl's legs within the apparatus. The correct position is generally with the back of the hock joints against the knife 57, and with one leg on either side of guide 56. The spacing of knife 57 from blades 13 is that distance which will place the hock joints in the cutting path of blades 13.

In the operation of the apparatus shown in FIGURES 1, 2, and 3, an operator, preferably standing to one side of the machine, places the feet of a fowl on activating plate 38 with one of the fowl's legs on each side of guide member 56 and with the back of hock joints generally located against positioning knife 57. The body of the fowl will then be located over the top of activating plate 37. With one hand the operator holds and pushes the fowl's feet against plate 38, while with the other hand he pushes the body of the fowl against plate 37. The pressure exerted on plates 37 and 38 must be sufficient to overcome the force of springs 43 and 47 and allow switches 34 and 35 to close. Preferably, the strength of each of springs 43 and 47 is such that the force exerted by the weight of the fowl alone is not sufficient to compress them, and an additional push on the part of the operator is required to activate the shear. The closing of switches 34 and 35 completes the cutting blades activating circuit as previously described. Upon completion of the activating circuit, pump 25 and accumulator 26 deliver fluid to the top of cylinder 17 by way of conduits 27 and 28 and valve 24 thus causing piston rod 18 to move downwardly. The downward motion of rod 18 is transmitted to shearing blades 13 by way of intermediate links 19 which causes blades 13 to close and sever the fowl's feet. The operator then removes both the severed feet and the body of the bird from the machine and places them in an appropriate container. After blades 13 have closed, cam lug 54 will open switch 49 and allow blades 13 to return to their normally open position and ready the machine for another cycle.

FIGURES 4 and 5 illustrate a modification of the switch actuating plate system of the present apparatus. (Elements interchangeable with the embodiment shown in FIGURES 1 and 2 are designated by the same reference characters bearing a prime notation.) In this embodiment of the invention, the dual activating plates 37 and 38 as well as leg guide member 56 and positioning knife 57, as shown in the first embodiment, are replaced by a single pivoted slotted plate 58. As shown in FIGURE 5, plate 58 essentially constitutes a lever pivoted in a position substantially vertical to a table top 10', about a pin 59 which serves as a fulcrum point. A portion of plate 58 extends below the surface of table top 10', and is in operative association with an actuating switch 60 through connecting member 62. A spring 63 which is slidably positioned around the connecting member 62 maintains plate 58 in a substantially vertical position and out of contact with connecting member 62 until the plate 58 is pivoted counterclockwise about pin 59.

FIGURE 4 shows that plate 58 is provided with a pair of guide slots 64 which are of sufficient width to permit the entry of the leg of a fowl 65 (shown in phantom in FIGURE 5) but which are not sufficiently wide to allow the passage of the feet. Plate 58 is spaced a sufficient distance back from blades 13' to place the hock joints of a fowl in the shearing path of blades 13' when the top portion of plate 58 is pivoted to its forwardmost position (shown in phantom in FIGURE 5) by action of an operator pulling forward on a fowl when its feet are engaged in the slots thereof.

A switch 60 is mounted internally in the case 11' and is electrically connected with the blade actuating circuit in substantially the same manner as switches 34 and 35 shown in FIGURE 3, the only difference being that where the apparatus shown in FIGURE 3 uses two microswitches in series the apparatus of FIGURES 4 and 5 uses one.

In the operation of the apparatus shown in the second embodiment, an operator preferably standing in front of the machine inserts the legs of a fowl into slots 64, then pulls the fowl towards the front of the machine. In pulling the fowl forward, the feet of the fowl engage the rear surface of plate 58 thereby tilting it forward on pin 59. The pivoting motion of plate 58 causes its lower portion to engage connecting member 62 and to close microswitch 60. The closing of switch 60 completes the activating circuit. Completing of the activating circuit causes the hydraulically driven pivoted blade system to shut and sever the fowl's feet at the hock joints, which have been brought in line with the blades by the pulling of the feet against pivoted slot plate 58.

The above embodiments of the invention are illustrated as using hydraulic driving means for powering the shearing blades. It should be understood that alternative driving means powered by compressed air, electric power, etc., when coupled with suitable electrical or mechanical linkages well known to those skilled in the art, could be used with equal facility. It should also be understood that other shearing blade configurations such as straight single bladed shears well known to those skilled in the art could be used without changing the basic inventive aspects of the invention.

Obviously many modifications and variations of the invention as hereinbefore set forth may be made without departing from the spirit and scope thereof, and

We claim:

1. A device for cutting feet from the legs of poultry which comprises: a powerdriven shear mounted to cut in a given plane; guide means spaced from said shear and substantially parallel thereto; and pressure responsive control means operatively connected to said powerdriven shear, whereby the feet of said poultry are severed when pressure is applied to said control means through said poultry while holding said poultry in proper position against guide means.

2. A shearing device for cutting feet from the legs of poultry which comprises: a pair of scissor-like shearing blades mounted to pivot into shearing contact in a given plane; guide means spaced from said blades and substantially parallel thereto; power means operatively connected to pivot said blades; and control means operatively connected to said power means, whereby the feet of said poultry are severed by the exertion of force against said control means through said poultry while holding said poultry in proper position against said guide means.

3. A poultry foot cutting apparatus which comprises: a supported table surface; a powerdriven shear mounted to cut in a given plane substantially vertical to said table surface; guide means affixed to said table surface, spaced from said shear, and substantially parallel thereto; and pressure responsive control means operatively connected to said shear, whereby said shear may be activated by application of pressure to said control means.

4. A device for cutting feet from the legs of poultry which comprises: a powerdriven shear mounted to cut in a given plane; guide means spaced from said shear and substantially parallel thereto; and a plurality of pressure responsive control means interdependently and operatively connected to said shear, whereby all of said pressure responsive control means must be activated by application of pressure thereto before said shear is actuated, said pressure being applied through said poultry in contact with said plurality of pressure responsive means.

5. A shearing device for cutting feet from the legs of poultry which comprises: a pair of scissor-like shearing blades mounted to pivot into shearing contact in a given plane; guide means spaced from said blades and substantially parallel thereto; power means operatively connected to pivot said blades; and a plurality of pressure responsive control means operatively and interdependently connected to said power means, whereby application of pressure to all of said pressure responsive control means is necessary to activate said power means and said shear, the pressure being applied to said pressure responsive control means through said poultry in contact with said plurality of control means.

6. A device for cutting feet from the legs of poultry which comprises: a powerdriven shear mounted to cut in a plane substantially vertical to a table surface; guide means attached to said table surface, spaced from said shear, and substantially parallel thereto; a knife edge horizontally positioned between said shear and said guide means; a plurality of pressure responsive control means operatively and interdependently connected to said shear, whereby all of said pressure responsive control means must be activated before said shear is actuated, the pressure being applied through said poultry in contact with said plurality of pressure responsive control means while said poultry is held in proper cutting position.

7. A device for cutting feet from the legs of poultry which comprises: a table surface; a powerdriven shear mounted to cut in a plane substantially vertical to said table surface; guide means comprising a slotted plate positioned substantially vertical with respect to said table surface and substantially parallel to said shear, said plate being pivotal toward said plane; and control means operatively connected to said plate and to said shear, whereby the pivoting motion of said slotted plate toward said plane activates said control means and causes said shear to sever the legs of said poultry when said poultry, with the legs thereof engaged in the slots of said plate, is forwardly drawn.

8. A shearing device for cutting feet from the legs of poultry which comprises: a pair of scissor-like shearing blades mounted to cut in a given plane; a pivotally mounted guide means comprising a slotted plate spaced from said blades and substantially parallel thereto, power means operatively connected to pivot said blades; and control means operatively connected to said plate and to said shear, whereby the pivoting of said plate causes said control means to activate said power means and pivot said blades into cutting relationship.

9. A shearing device for cutting feet from the legs of poultry which comprises: a pair of scissor-like shearing blades mounted to pivot into shearing contact in a plane substantially vertical to the forward end of a table, guide means spaced from said blades and substantially parallel thereto; power means connected to pivot said blades; control means comprising a pair of depressable plates connected to said table on opposite sides of said plane and a pair of pressure responsive activating means connected to each of said plates, said activating means being interdependently connected to said power means whereby both must be activated before said power means is activated to pivot said blades into cutting relationship.

References Cited in the file of this patent
UNITED STATES PATENTS

| 817,598 | Stolpe | Apr. 10, 1906 |
| 2,657,672 | Angell | Nov. 3, 1953 |
| 2,795,816 | Spang et al. | June 18, 1957 |